United States Patent [19]

Adams

[11] 3,930,676
[45] Jan. 6, 1976

[54] HOSE COUPLING AND JOINT

[75] Inventor: Cecil L. Adams, Burton, Ohio

[73] Assignee: Parker-Hannifin Corporation, Cleveland, Ohio

[22] Filed: Dec. 13, 1974

[21] Appl. No.: 532,456

Related U.S. Application Data

[63] Continuation of Ser. No. 89,483, Nov. 13, 1970, abandoned, which is a continuation of Ser. No. 788,490, Jan. 2, 1969, abandoned.

[52] U.S. Cl. .............................. 285/253; 285/259
[51] Int. Cl.² .................................... F16L 33/02
[58] Field of Search ........... 285/239, 240, 241, 242, 285/252, 253, 254, 255, 259, 256

[56] References Cited
UNITED STATES PATENTS

| 186,855 | 1/1877 | Leland | 285/255 |
|---|---|---|---|
| 2,937,892 | 5/1960 | Prescott | 285/259 X |
| 3,174,777 | 3/1965 | Lodholm et al. | 285/259 X |

FOREIGN PATENTS OR APPLICATIONS

| 22,737 | 2/1921 | France | 285/239 |
|---|---|---|---|
| 1,160,833 | 3/1958 | France | 285/256 |
| 534,155 | 1/1922 | France | 285/255 |
| 506,941 | 12/1954 | Italy | 285/242 |

Primary Examiner—Thomas F. Callaghan
Attorney, Agent, or Firm—John N. Wolfram

[57] ABSTRACT

A hose coupling and joint in which a nipple insertable within a relatively hard but flexible tube, such as reinforced nylon, has a long smooth tapered portion at its outer end and a series of barbs at its inner end whose edges define a reverse taper, the barb of largest diameter being at the inner end of the smooth tapered portion and no larger than the inside diameter of the hose to permit ready insertion of the nipple into the hose without damaging the latter. The hose is held upon the nipple by a band type clamp that encircles the hose opposite the barbs.

3 Claims, 3 Drawing Figures

INVENTOR:
CECIL L. ADAMS
ATTORNEY
John N. Wolfram

HOSE COUPLING AND JOINT

This is a continuation of application Ser. No. 89,483 filed Nov. 13, 1970, now abandoned, which is a continuation of Ser. No. 788,490 filed Jan. 2, 1969, now abandoned.

BACKGROUND OF THE INVENTION

Reinforced hose of relatively hard yet flexible materials, such as nylon, have come into use for installation in air conditioning equipment for conducting refrigerant fluids, automotive hydraulic brake systems, and other application in which they are subject to high pressures and/or corrosive fluids. In air conditioning applications, for example, pressures may be as high as 500 p.s.i. while in hydraulic system applications the pressures may reach 3,000 p.s.i.

Hose of these materials is very difficult to stretch over barbs of conventional hose coupling nipples in which the barbs are of larger diameter than the inside diameter of the hose and is easily damaged when an effort is made to accomplish this. Moreover, when installed on such couplings in which the barbs are of increasing diameter from the outer end of the nipple toward the inner end, the joint has a tendency to loosen and leak when subjected to internal fluid pressure and/or mechanical pullout forces.

SUMMARY OF THE INVENTION

The present invention overcomes these difficulties by providing a hose coupling in which the largest diameter of the nipple is substantially the same diameter as the inside diameter of the hose to permit ready insertion therein without damage. The outer end of the nipple has a long smooth tapered portion to provide unconfined support of the hose over a long section thereof and the barbs on the nipple are at the inner end thereof and define a reverse taper whereby pressure or pullout forces on the hose increases the grip thereon by a band clamp that encircles the hose opposite the barbs.

DESCRIPTION

Figure 1:
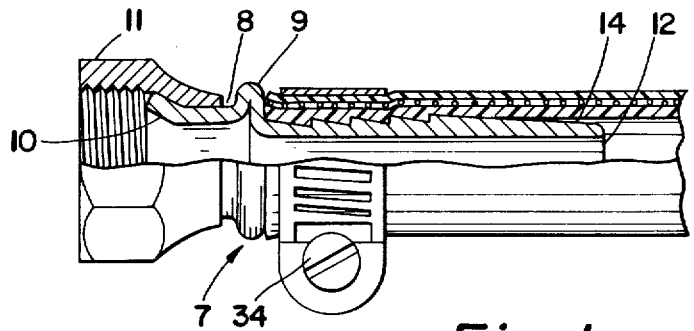
FIG. 1 is a partial cross section showing the hose coupling joint.

The hose coupling 7 has at one end an adapter portion 8 upon which is formed a bead 9 and a flare 10. A nut 11 is assembled to the adapter end before formation of flare 10 and is used to connect the hose assembly to its place of use.

Hose coupling 7 has at its other end an elongated tubular nipple 12. At its outer end, nipple 12 has a smooth tapered outer portion 14 whose length is from about 1½ to 2 times the maximum diameter thereof. The taper angle is about 1½° with the smallest diameter being at the outer end of the nipple. The largest diameter of tapered outer portion 14 is at the inner end thereof and forms a first and largest barb 15 followed by additional barbs 16, 17 and 18.

Figure 2:
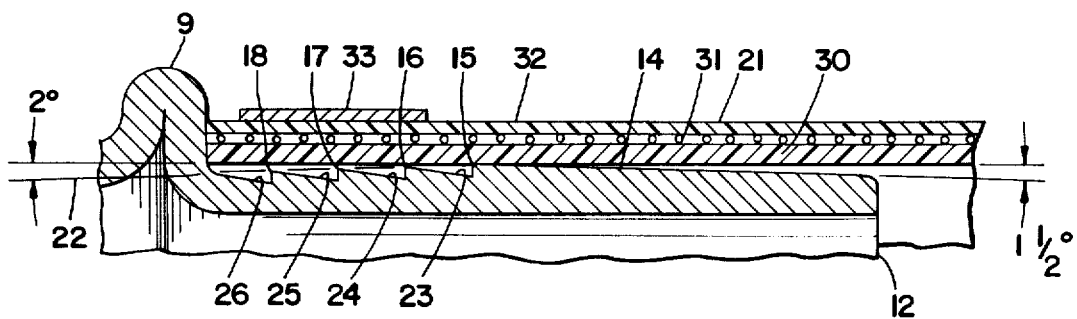
FIG. 2 is a enlarged fragmentary cross section showing the hose loosely assembled over the nipple before tightening of the clamp.

As shown in FIG. 2, the diameter of barb 15 is substantially the same as or slightly smaller than the inside diameter of hose 21 and the remaining barbs are of progressively decreasing diameter at their edges 16, 17 and 18 whereby a longitudinally extending diameter at their edges is at an angle of about 2° to the horizontal. The longitudinal faces 23, 24, 25 and 26 of the barbs are tapered in a reverse direction to form a saw tooth type configuration in cross section.

Hose 21 as illustrated comprises a nylon inner tube 30, a nylon reinforcing braid 31 and an outer cover 32 of urethane. However, tubes of other materials and constructions may be used.

Figure 3:
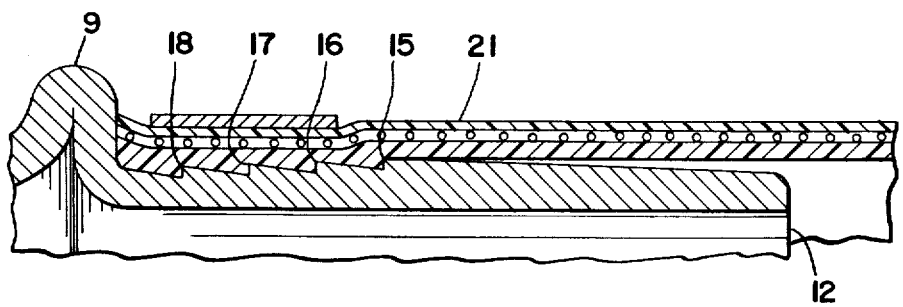
FIG. 3 is an enlarged fragmentary cross section showing the hose clamped upon the nipple.

When the hose coupling is loosely assembled as shown in FIG. 2, with a band type clamp 33 encircling hose 21, the clamp is positioned so that it overlaps barbs 16, 17 and 18 but is axially spaced from the largest barb 15. The clamp is then tightened by turning of screw 34 and the hose is compressed over the barbs in the manner shown in FIG. 3. The height of each barb is less than the wall thickness of inner liner 30 so that there is no danger of cutting through such inner liner.

Nipple outer portion 14 is out of contact with hose liner 30 throughout most of the length of the former to permit flexing of the hose but because of the long length of the smooth outer portion 14 and the very small clearance it has with the inside diameter of the hose such flexing will be very slight over the nipple so that it is substantially non-existent at the first barb 15. Moreover, the axial spacing between clamp 33 and barb 15 results in maximum compression of the hose at the second barb 16 rather than at the first barb 15 so that any stretching or other hose movement at barb 15 is not resisted in an abrupt manner. This results in a longer life for the joint.

I claim:

1. A hose coupling joint comprising a hose of relatively hard but flexible material resistant to radially outward expansion, a coupling having a radial abutment and having a nipple extending from one side of the abutment into an end of the hose, the nipple having axially inner and outer annular portions each of greater length than their maximum outside diameters, said abutment extending radially beyond each of said inner and outer portions the outer portion having a smooth uninterrupted exterior surface that tapers at an angle of substantially 1½° to the longitudinal axis of the coupling from a smaller diameter at its outer end to a larger diameter at its inner end, said larger diameter being substantially the same as the normal inside diameter of the hose and said smaller diameter being smaller than the normal inside diameter of the hose to facilitate the insertion of said nipple into said hose and to permit flexing and radial movement of the hose relative to said outer portion, a first barb at the inner end of said outer portion, a series of additional barbs between said first barb and said abutment, the inner edge of each barb being smaller in diameter than the inner edge of the adjacent barb in the axially outward direction whereby a line through said edges makes an angle of about 2° with the longitudinal axis of said nipple, a circular clamp having a smooth inner surface and of less axial length than said inner portion surrounding the hose radially opposite all of said additional barbs and clamping the hose thereagainst, said clamp prior to applying clamping pressure having a substantially uniform inner diameter whereby upon radial contraction of said clamp there is progressively greater compression of the hose against said additional barbs in a direction toward said outer portion, the axially outer end of said clamp being spaced axially inwardly of said first barb whereby direct clamping pressure applied by the clamp to the hose will be on said additional barbs and there will be no direct clamping pressure from the clamp applied at the first barb so that stretching or flexing of the hose is not resisted in an abrupt manner at said first barb.

2. The joint of claim 1 in which said outer end of the clamp is axially intermediate said first barb and the additional barb adjacent thereto.

3. The joint of claim 1 in which the innermost of said additional barbs is spaced from said abutment substantially the same distance as the spacing between said additional barbs and in which the axially inner end of the clamp is between said abutment and the adjacent one of said additional barbs.

* * * * *